US008151833B2

(12) United States Patent
Thomas et al.

(10) Patent No.: US 8,151,833 B2
(45) Date of Patent: Apr. 10, 2012

(54) MACHINE FOR TESTING CONTAINER CAPACITY

(75) Inventors: Alan E. Thomas, Clearwater, FL (US); Michael C. Bagley, Palm Harbor, FL (US); Philippe Spiteri, St. Petersburg, FL (US)

(73) Assignee: Emhart Glass S.A., Cham (CH)

(*) Notice: Subject to any disclaimer, the term of this patent is extended or adjusted under 35 U.S.C. 154(b) by 0 days.

(21) Appl. No.: 13/164,043

(22) Filed: Jun. 20, 2011

(65) Prior Publication Data

US 2011/0247720 A1 Oct. 13, 2011

Related U.S. Application Data

(63) Continuation of application No. 11/903,868, filed on Sep. 24, 2007, now Pat. No. 7,963,302.

(60) Provisional application No. 60/827,009, filed on Sep. 26, 2006.

(51) Int. Cl.
*B65B 1/30* (2006.01)
*G01F 23/00* (2006.01)

(52) U.S. Cl. .................. 141/95; 141/2; 141/83; 141/94; 141/198; 73/290 R

(58) Field of Classification Search ................ 141/2, 83, 141/94, 95, 144–148, 143, 165, 192, 198; 73/37, 40, 45, 49.2, 290 R
See application file for complete search history.

(56) References Cited

U.S. PATENT DOCUMENTS

| | | | | |
|---|---|---|---|---|
| 3,751,973 | A | 8/1973 | Strauss et al. | |
| 3,771,649 | A | 11/1973 | Strauss | |
| 3,805,594 | A * | 4/1974 | Hayashi | 73/49.2 |
| 3,879,987 | A | 4/1975 | Yasuhiro et al. | |
| 4,033,172 | A | 7/1977 | Flamand | |
| RE31,385 | E | 9/1983 | Schmidt et al. | |
| 4,423,628 | A * | 1/1984 | Richter | 73/290 R |
| 4,557,301 | A | 12/1985 | Jorss | |
| 4,582,102 | A | 4/1986 | Risser | |
| 4,788,850 | A | 12/1988 | Buschor et al. | |
| 4,852,415 | A * | 8/1989 | Bogatzki et al. | 73/865.8 |
| 5,295,517 | A | 3/1994 | Ahlers | |
| 5,313,990 | A * | 5/1994 | Clusserath | 141/6 |
| 5,319,957 | A * | 6/1994 | Stieger et al. | 73/49.2 |
| 5,320,144 | A * | 6/1994 | Ahlers | 141/1 |
| 5,450,882 | A * | 9/1995 | Cragun | 141/9 |
| 5,501,253 | A * | 3/1996 | Weiss | 141/40 |
| 5,865,225 | A * | 2/1999 | Weiss | 141/198 |
| 6,474,368 | B2 | 11/2002 | Clusserath et al. | |
| 6,761,191 | B2 * | 7/2004 | Rosen et al. | 141/91 |
| 7,311,125 | B2 * | 12/2007 | Krulitsch | 141/149 |
| 7,543,479 | B2 * | 6/2009 | Thomas et al. | 73/37 |
| 7,963,302 | B2 * | 6/2011 | Thomas et al. | 141/95 |

* cited by examiner

*Primary Examiner* — Timothy L Maust
(74) *Attorney, Agent, or Firm* — Reinhart Boerner Van Deuren s.c.

(57) ABSTRACT

An inspection machine for inspecting the volume of liquid contained by a bottle filed to its defined fill height. A head is lowered and has a sealing plate which seals the open finish of a bottle. A fill tube assembly is part of the head and continues to be lowered until a level sensor is located to sense liquid at a pre-fill level. High and low pressure water lines which are a part of the fill tube assembly are operated to fill the bottle to the pre-fill level. The sealing plate is released and then the process is repeated lowering the sensor to the post-fill level and operating only the low-pressure line to fill the bottle to the post-fill level. The total liquid filling the bottle is then computed.

20 Claims, 5 Drawing Sheets

MACHINE FOR TESTING CONTAINER CAPACITY

CROSS REFERENCE TO RELATED APPLICATIONS

This patent application is a continuation of U.S. patent application Ser. No. 11/903,868, filed on Sep. 24, 2007, now U.S. Pat. No. 7,963,302, issued on Jun. 21, 2011, entitled "Machine For Testing Container Capacity," which in turn claimed the benefit of U.S. Provisional Patent Application No. 60/827,009, filed on Sep. 26, 2006, both of which patent applications are assigned to the assignees of the present invention and both of which patent applications are hereby incorporated herein by reference in their entirety.

BACKGROUND OF THE INVENTION

Field of the Invention

The present invention relates generally to machines for inspecting containers and more specifically to such machines that provide feedback information to be used by an operator to modify the performance of the machine that produced the container.

It is important that a bottle be filled with the correct volume of liquid. Too little liquid raises customer issues since a customer expects to receive the quoted volume and too much liquid raises cost issues since a container with excess liquid has an unnecessarily high cost.

Prior art systems that test the capacity volume of a container often require operators to take a container, weigh the container, fill the container, measure the water temperature, draw off water to the defined fill level and re-weigh the container. A temperature correction must then be made to define the volume of liquid.

It is accordingly desirable to provide a machine that can automatically define the volume of liquid contained by a container.

SUMMARY OF THE INVENTION

The disadvantages and limitations of the background art discussed above are overcome by the present invention, which is a machine that can automatically define the volume of liquid contained by a container.

In one aspect of the present invention, a method of measuring the volume of liquid contained within a bottle having a formed finish at the top thereof is provided, the bottle being supported in an inspection station having a vertically displaceable head including a fill tube with a high volume/time liquid supply and a low volume/time liquid supply for selectively delivering liquid into the fill tube and a liquid level sensor extending downwardly through the fill tube, the method including: displacing the head to a pre-fill height position with respect to the bottle and delivering a measured volume of liquid into the fill tube from both the high volume/time liquid supply and the low volume/time liquid supply until the level sensor senses liquid at a pre-fill height, whereupon the high volume/time liquid supply and the low volume/time liquid supply are turned off and the head is displaced to an off finish position; displacing the head to a post-fill height position with respect to the bottle and delivering a measured volume of liquid into the fill tube from the low volume/time liquid supply until the level sensor senses liquid at a post-fill height, whereupon the low volume/time liquid supply is turned off; and determining the total volume of liquid delivered from the high volume/time liquid supply and the low volume/time liquid supply through the fill tube into the bottle.

In another aspect of the present invention, a method of measuring the volume of liquid contained within a bottle having a formed finish at the top thereof is provided, the bottle being supported in an inspection station having a vertically displaceable head including a fill tube with a high volume/time liquid supply and a low volume/time liquid supply for selectively delivering liquid into the fill tube and a liquid level sensor extending downwardly through the fill tube, the method including: displacing the head to a pre-fill height position with respect to the bottle and delivering a measured volume of liquid into the fill tube from at least the high volume/time liquid supply until the level sensor senses liquid at a pre-fill height, whereupon the high volume/time liquid supply and the low volume/time liquid supply are turned off; displacing the head to a post-fill height position with respect to the bottle and delivering a measured volume of liquid into the fill tube from the low volume/time liquid supply until the level sensor senses liquid at a post-fill height, whereupon the low volume/time liquid supply is turned off; and determining the total volume of liquid delivered from the high volume/time liquid supply and the low volume/time liquid supply through the fill tube into the bottle.

In yet another aspect of the present invention, a machine for measuring the volume of liquid contained within a bottle having a formed finish at the top thereof is provided, the machine including: a first liquid supply apparatus for selectively a high volume/time supply of a liquid; a second liquid supply apparatus for selectively a low volume/time supply of a liquid; apparatus for supporting the bottle in the inspection station; a vertically displaceable head including a fill tube connected to deliver liquid supplied by the first and second liquid supply apparatuses and a liquid level sensor extending downwardly through the fill tube; flow measurement apparatus for measuring the flow of liquid delivered into the fill tube; a vertically displaceable actuator mechanism for vertically displacing the head; a system control for operating the machine in first and second modes; wherein in the first mode the head is displaced to a pre-fill height position with respect to the bottle and delivers a measured volume of liquid into the fill tube from both the first liquid supply apparatus and the second liquid supply apparatus until the level sensor senses liquid at a pre-fill height, whereupon the first liquid supply apparatus and the second liquid supply apparatus are turned off and the head is displaced to an off finish position; wherein in the second mode the head is displaced to a post-fill height position with respect to the bottle and delivers a measured volume of liquid into the fill tube from the second liquid supply apparatus until the level sensor senses liquid at a post-fill height, whereupon the low volume/time liquid supply is turned off; and wherein the machine further includes a computing apparatus included in the system control that computes the volume of liquid delivered to the fill tube by the first liquid supply apparatus and the second liquid supply apparatus in the first and second modes.

Other objects and advantages of the present invention will become apparent from the following portion of this specification and from the accompanying drawings which illustrate, in accordance with the mandate of the patent statutes, a presently preferred embodiment incorporating the principles of the invention.

DESCRIPTION OF THE DRAWINGS

These and other advantages of the present invention are best understood with reference to the drawings, in which.

DETAILED DESCRIPTION OF THE EXEMPLARY EMBODIMENT

Figure 1:
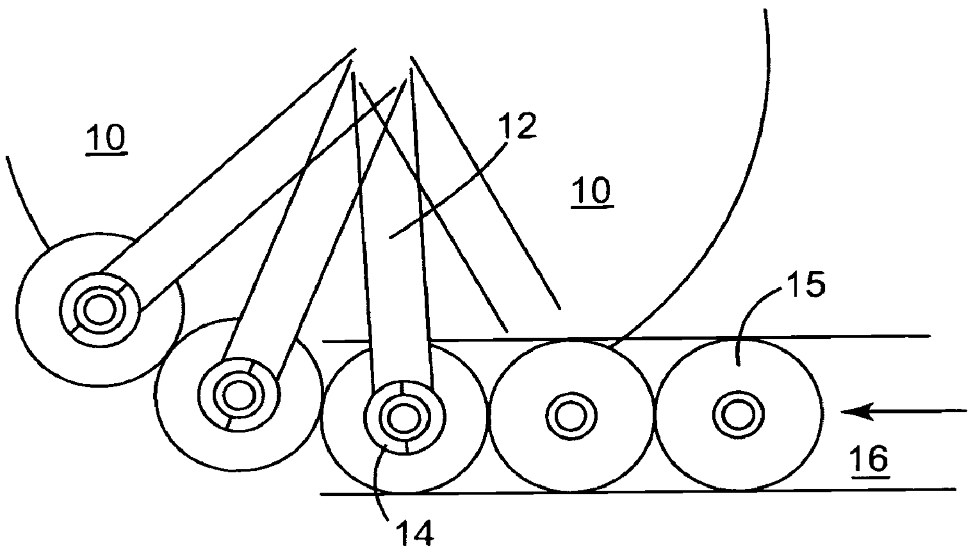
FIG. 1 is a top schematic view of an inspection machine having a turret assembly which receives bottles from a feed conveyor.
Figure 2:
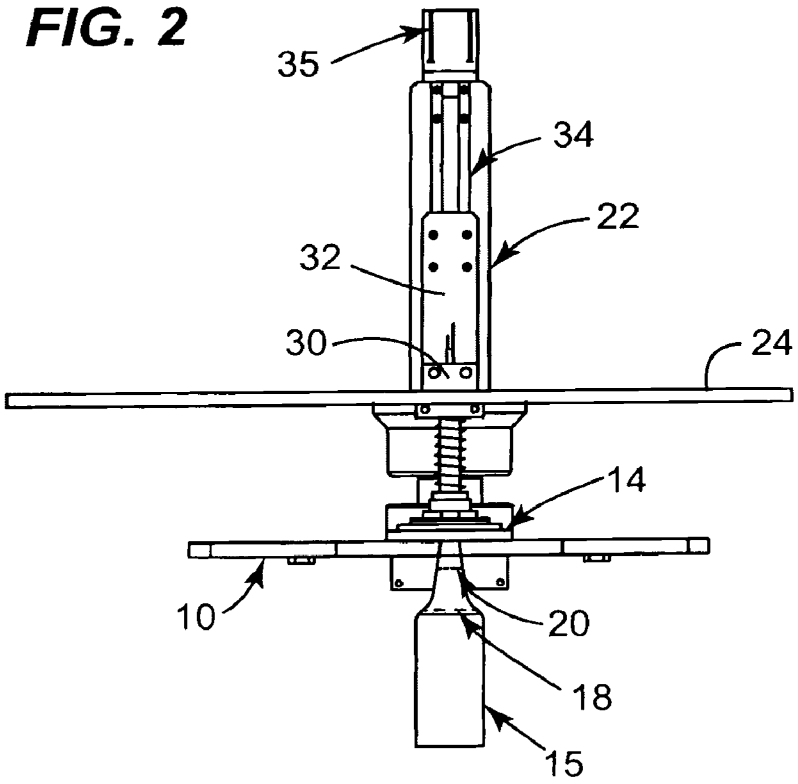
FIG. 2 is an elevational view showing a bottle at the inspection station.

The inspection machine has a turret assembly 10 illustrated in FIG. 1 which includes a number of angularly spaced arms 12 each having a bottle gripper 14 at the outer end which is displaceable between an open position and a closed position where the bottle 15 is gripped or supported immediately below the finish of the bottle. The turret assembly receives bottles from a suitable conveyor 16. FIG. 2 illustrates a bottle at the inspection station. Indicated on the bottle are a pre-fill height line 18 and a post-fill height line 20 (which corresponds to the desired fill level of the bottle).

Figure 3:
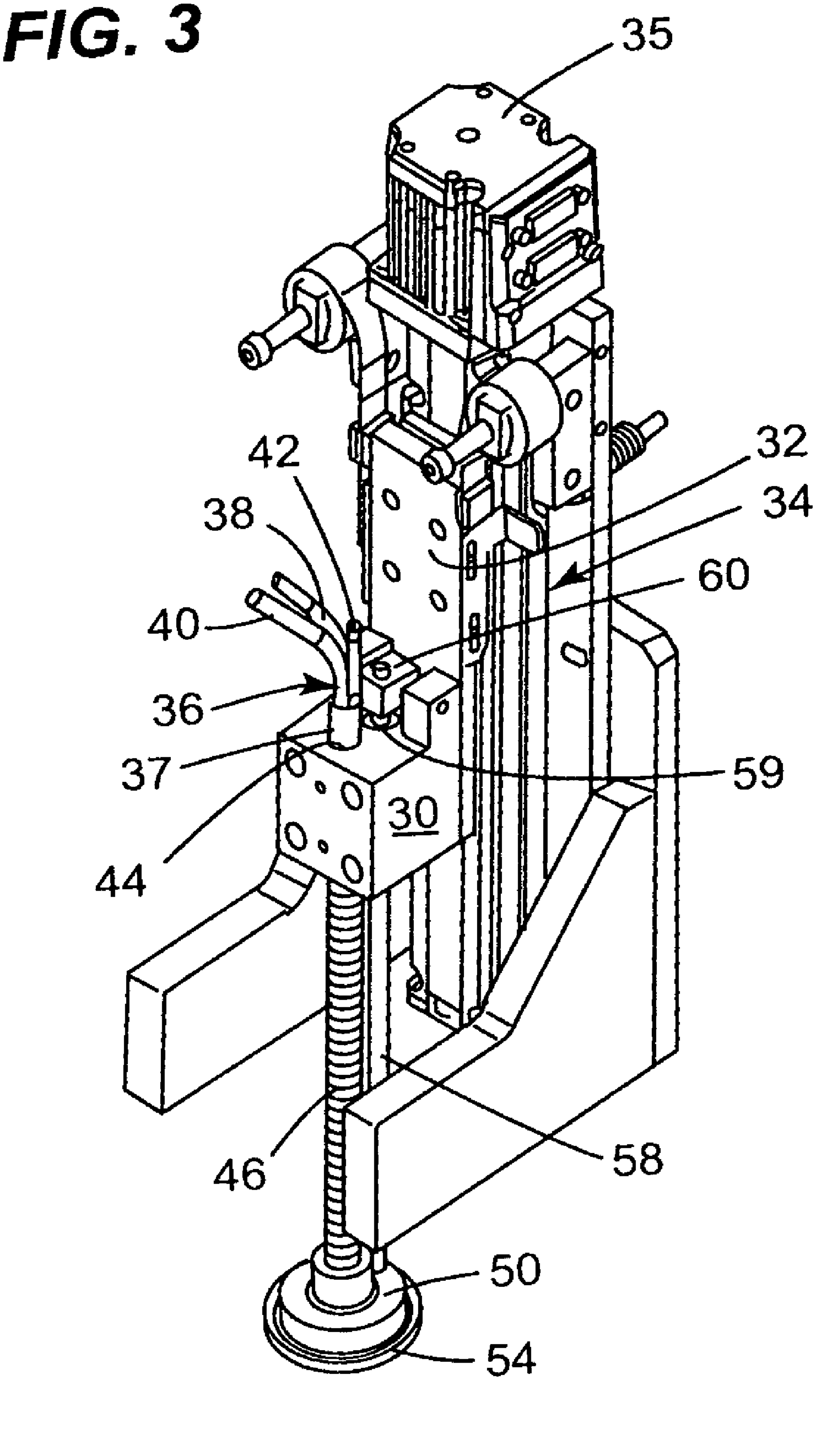
FIG. 3 is an oblique view of the capacity sensor assembly.
Figure 4:
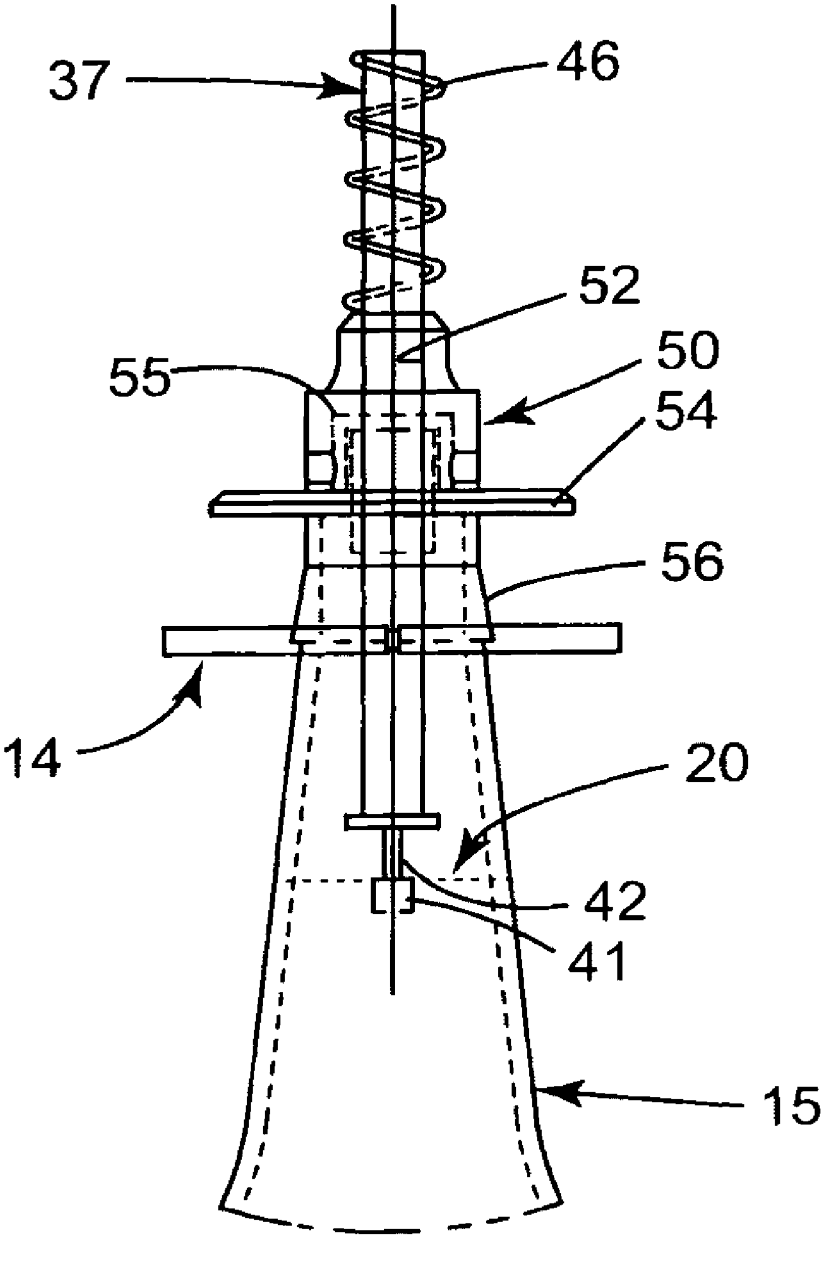
FIG. 4 is an elevational view of a portion of the capacity sensor assembly.

A capacity sensor assembly 22, supported by a plate 24, overlies the bottle at the inspection station. A support block 30 (FIGS. 2 through 4) is secured to a vertically displaceable slide 32 of a linear actuator 34 which is driven by a servomotor 35. A fill tube assembly 36, made up of a cylindrical tube 37, a high pressure water conduit 38, a low pressure water conduit 40, and a liquid level sensor, which can be a prismatic element 41 secured to the bottom of a sensor cable 42, secured within the tube 37, is mounted in a suitable through hole 44 in the support block 30. A spring 46 is secured at its top to the bottom of the support block 30 around the cylindrical tube 37 and is secured at its bottom to a fill height block 50.

The fill height block 50, which has a vertical hole 52 (FIG. 4) through which the fill tube assembly 36 passes, has an annular sealing plate 54 secured at its bottom, which, as the support block 30 is lowered, will engage and seal the top surface 55 of the bottle finish 56. A vertical pin 58 (FIG. 3) is screwed into a suitably threaded hole in the top of the fill height block 50 and extends through a vertical hole 59 in the support block 30. Affixed to its top is a light break 60. When the annular sealing plate 54 engages the finish, further displacement of the support block 30 elevates the light break 60, breaking a light beam and thereby generating a Sealing Plate On/Off Finish signal (FIG. 5).

Figure 5:
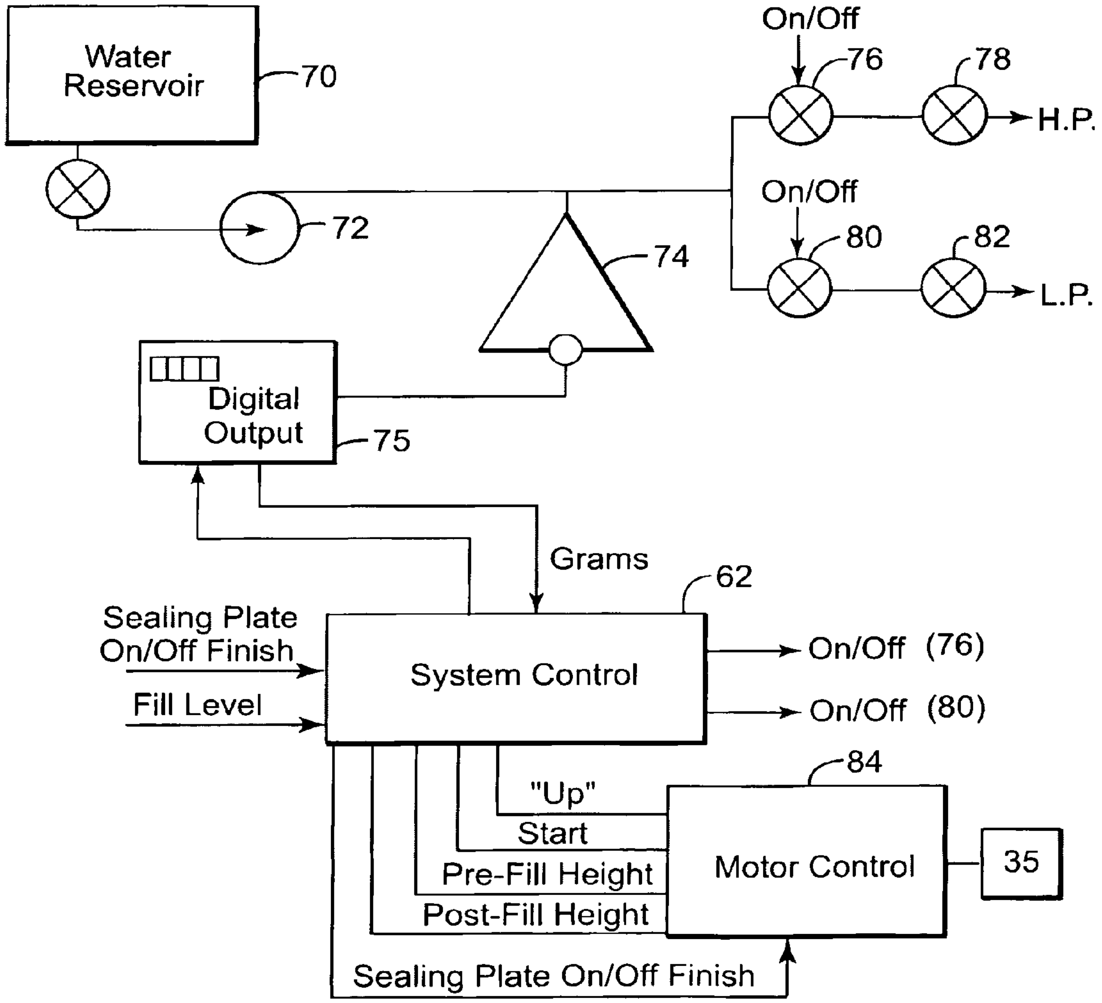
FIG. 5 is a system schematic.
Figure 6:
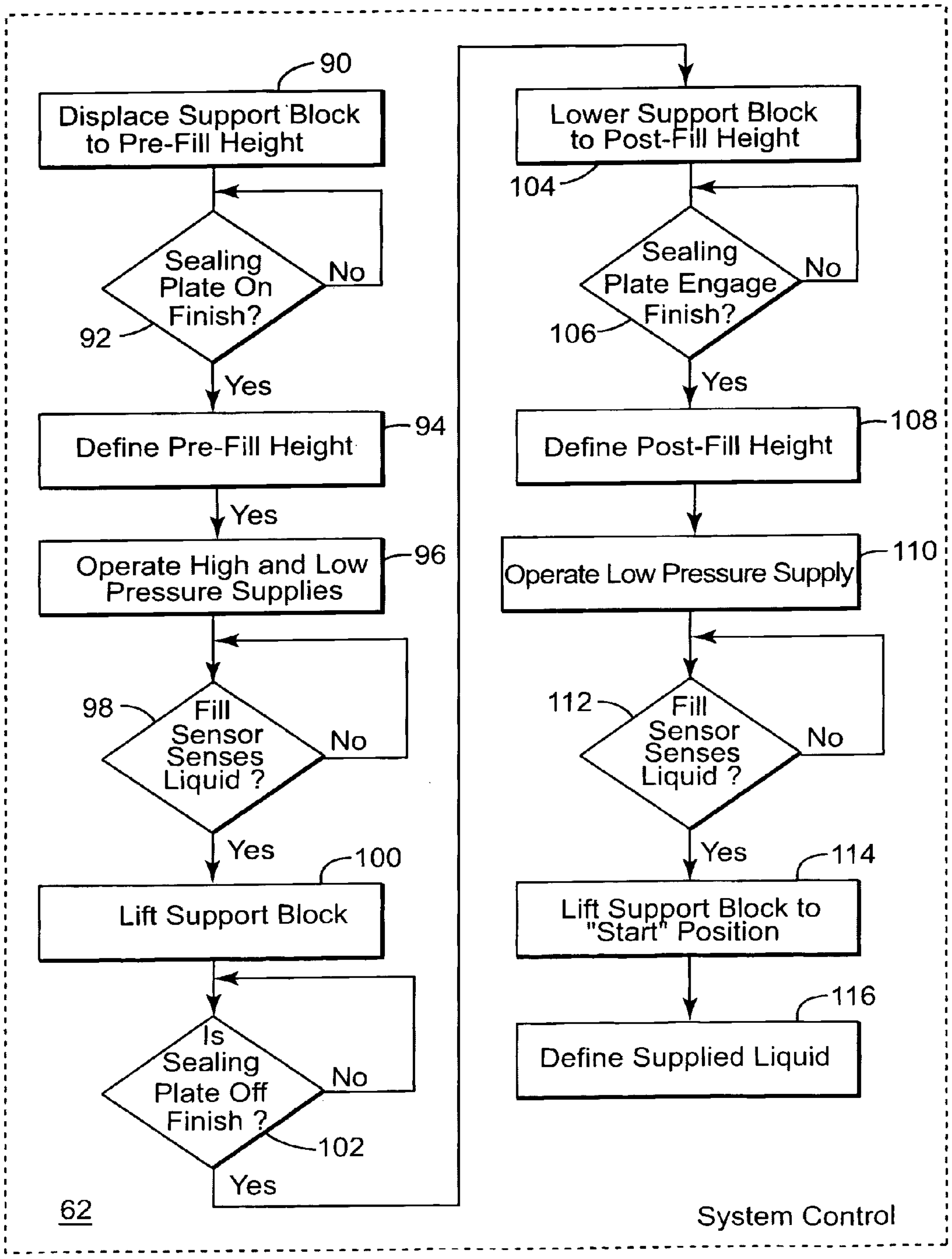
FIG. 6 is a logic diagram illustrating the System Control.

The overall system is schematically illustrated in FIG. 5. Water from a Water Reservoir 70 is supplied to a high-pressure pump 72, which supplies the water to a Coriolis valve 74. The output of this Coriolis valve 74 is split. One line goes to a first ON/OFF valve 76 and then to a first pressure reducer valve 78 which outputs water at high pressure (H.P.) to the high-pressure water conduit 38. The other line goes to a second ON/OFF valve 80 and then to a second pressure reducer valve 82 which outputs water at low pressure (L.P.) to the low-pressure water conduit 40. The Coriolis valve 74 has a Digital Output 75 which supplies Grams of flow upon the request of the System Control 62. A single Coriolis valve 74 is shown, but there could alternately be a pair of Coriolis valves each connected to a pressure line (one line going to the first ON/OFF valve 76 and the other line going to the second ON/OFF valve 80) and each having a digital readout supplied to the System Control 62.

The System Control 62 also receives a Fill Level signal from the level sensor when liquid is sensed at the pre- or post-fill levels and operates the first On/Off valve 76 and the second On/Off valve 80 with suitable On/Off signals. The System Control 62 also instructs the Motor Control 84 to locate the support block 30 at the "START," "Pre-Fill Height," or "Post-Fill Height" positions, and instructs the support block 30 to go "UP." The System Control 62 also supplies a Sealing Plate On Finish signal, which is triggered by the light break 60, to the Motor Control 84.

When a bottle 15 to be inspected is located at the inspection station with the support block 30 at the Start position, the System Control 62 instructs the Motor Control 84 to Lower Support Block to Pre-Fill Height 90. When the System Control 62 answers the query "Sealing Plate On Finish?" 92 in the affirmative, the Motor Control 84 will Define Pre-Fill Height 94 as a distance vertically down from the top of the bottle finish 56. The System Control 62 will then instruct the Motor Control 84 to Operate High and Low Pressure Supplies 96 by sending "ON" signals to the high pressure on/off valve 76 and the low pressure on/off valve 80.

When the liquid level has been raised to the pre-fill height line 18, the query "Fill Sensor Senses Liquid 98?" will be answered in the affirmative, and the System Control 62 will issue an "UP" signal to the Motor Control 84 to Lift Support Block 100. When the annular sealing plate 54 is lifted off the top of the bottle finish 56, the Sealing Plate On Finish signal will be removed (the light break 60 again blocks the light path), whereby the query "Is Sealing Plate Off Finish?" 102 can be answered in the affirmative. This allows the bottle 15 to freely reposition itself in the bottle gripper 14 as a result of the added weight of the water.

The System Control 62 issues a "Post-Fill Height" signal to the Motor Control 84 to Lower Support Block to Post-Fill Height 104. When the System Control 62 receives the Sealing Plate On Finish Signal, the query Sealing Plate Engages Finish 106 can be answered in the affirmative and the System Control 62 will Define Post-Fill Height 108. The System Control will Operate Low Pressure Supply 110 by sending an "ON" signal to the low pressure on/off valve 80.

When the liquid level has been raised to the post-fill height line 20, the query "Fill Sensor Senses Liquid 112?" will be answered in the affirmative, and the System Control 62 will issue a "Start" signal to the Motor Control 84 to Lift Support Block To Start Position 114. The System Control 62 will now update the digital grams since the last bottle 15 to Define Supplied Liquid 116. This enables the operator to know whether the post-fill height line 20 is at the correct location.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of measuring the volume of liquid contained within a bottle having a formed finish at the top thereof, the bottle being supported in an inspection station having a vertically displaceable head including a fill tube with a high volume/time liquid supply and a low volume/time liquid supply for selectively delivering liquid into the fill tube and a liquid level sensor extending downwardly through the fill tube, the method comprising:

displacing the head to a pre-fill height position with respect to the bottle and delivering a measured volume of liquid into the fill tube from both the high volume/time liquid supply and the low volume/time liquid supply until the level sensor senses liquid at a pre-fill height, whereupon the high volume/time liquid supply and the low volume/time liquid supply are turned off and the head is displaced to an off finish position;

displacing the head to a post-fill height position with respect to the bottle and delivering a measured volume of liquid into the fill tube from the low volume/time liquid supply until the level sensor senses liquid at a post-fill height, whereupon the low volume/time liquid supply is turned off; and determining the total volume of liquid delivered from the high volume/time liquid supply and the low volume/time liquid supply through the fill tube into the bottle.

2. A method as defined in claim 1, wherein the post-fill height of liquid in the bottle is higher than the pre-fill height of liquid in the bottle.

3. A method as defined in claim 1, wherein the post-fill height of liquid in the bottle corresponds to the desired fill level of the bottle.

4. A method as defined in claim 1, additionally comprising:

supporting the bottle with a gripping mechanism at a location on the bottle below and proximate to the finish of the bottle to maintain the bottle in a fixed position relative to the vertically displaceable head.

5. A method as defined in claim 1, wherein the inspection station has a vertically displaceable sealing plate, wherein the method further comprises:

lowering the sealing plate onto the finish of the bottle prior to displacing the head to the pre-fill height position;

raising the sealing plate off of the finish of the bottle after the level sensor senses liquid at the pre-fill height; and lowering the sealing plate onto the finish of the bottle prior to displacing the head to the post-fill height position.

6. A method as defined in claim 5, additionally comprising:

detecting when the sealing plate is located on the finish of the bottle, after which the head may be displaced to the pre-fill height position or the post-fill height position.

7. A method as defined in claim 5, wherein the inspection station has a vertically displaceable actuator mechanism for vertically displacing both the sealing plate and the head, wherein the method further comprises:

lowering the sealing plate and the head together until the sealing plate is located on the finish of the bottle; and maintaining the sealing plate on the finish of the bottle while the head is further lowered selectively to the pre-fill height position or the post-fill height position.

8. A method as defined in claim 1, wherein the step of delivering a measured volume of liquid from the high volume/time liquid supply comprises:

pumping the liquid from a source of the liquid with a high pressure pump; and wherein the step of delivering a measured volume of liquid from the low volume/time liquid supply comprises:

pumping the liquid from a source of the liquid with a low pressure pump.

9. A method as defined in claim 8, wherein the step of delivering a measured volume of liquid from the high volume/time liquid supply further comprises:

measuring the volume of liquid delivered from the high pressure pump with a Coriolis mass flow meter; and wherein the step of delivering a measured volume of liquid from the high volume/time liquid supply further comprises:

measuring the volume of liquid delivered from the low pressure pump with a Coriolis mass flow meter.

10. A method as defined in claim 1, wherein the step of delivering a measured volume of liquid from either or both of the high volume/time liquid supply and the low volume/time liquid supply comprises:

measuring the volume of liquid delivered into the fill tube with a Coriolis mass flow meter.

11. A method of measuring the volume of liquid contained within a bottle having a formed finish at the top thereof, the bottle being supported in an inspection station having a vertically displaceable head including a fill tube with a high volume/time liquid supply and a low volume/time liquid supply for selectively delivering liquid into the fill tube and a liquid level sensor extending downwardly through the fill tube, the method comprising:

displacing the head to a pre-fill height position with respect to the bottle and delivering a measured volume of liquid into the fill tube from at least the high volume/time liquid supply until the level sensor senses liquid at a pre-fill height, whereupon the high volume/time liquid supply and the low volume/time liquid supply are turned off;

displacing the head to a post-fill height position with respect to the bottle and delivering a measured volume of liquid into the fill tube from the low volume/time liquid supply until the level sensor senses liquid at a post-fill height, whereupon the low volume/time liquid supply is turned off; and determining the total volume of liquid delivered from the high volume/time liquid supply and the low volume/time liquid supply through the fill tube into the bottle.

12. A machine for measuring the volume of liquid contained within a bottle having a formed finish at the top thereof, comprising:

a first liquid supply apparatus for selectively a high volume/time supply of a liquid;

a second liquid supply apparatus for selectively a low volume/time supply of a liquid;

apparatus for supporting the bottle in the inspection station;

a vertically displaceable head including a fill tube connected to deliver liquid supplied by the first and second liquid supply apparatuses and a liquid level sensor extending downwardly through the fill tube;

flow measurement apparatus for measuring the flow of liquid delivered into the fill tube;

a vertically displaceable actuator mechanism for vertically displacing the head;

a system control for operating the machine in first and second modes;

wherein in the first mode the head is displaced to a pre-fill height position with respect to the bottle and delivers a measured volume of liquid into the fill tube from both the first liquid supply apparatus and the second liquid supply apparatus until the level sensor senses liquid at a pre-fill height, whereupon the first liquid supply apparatus and the second liquid supply apparatus are turned off and the head is displaced to an off finish position;

wherein in the second mode the head is displaced to a post-fill height position with respect to the bottle and delivers a measured volume of liquid into the fill tube from the second liquid supply apparatus until the level sensor senses liquid at a post-fill height, whereupon the low volume/time liquid supply is turned off; and wherein the machine further comprises:

a computing apparatus included in the system control that computes the volume of liquid delivered to the fill tube by the first liquid supply apparatus and the second liquid supply apparatus in the first and second modes.

13. A machine as defined in claim 12, wherein the post-fill height of liquid in the bottle is higher than the pre-fill height of liquid in the bottle.

14. A machine as defined in claim 12, wherein the post-fill height of liquid in the bottle corresponds to the desired fill level of the bottle.

15. A machine as defined in claim 12, wherein the apparatus for supporting the bottle in the inspection station comprises:

a gripping mechanism that supports the bottle at a location on the bottle below and proximate to the finish of the bottle to maintain the bottle in a fixed position relative to the vertically displaceable head.

16. A machine as defined in claim 12, additionally comprising:

a vertically displaceable sealing plate that is selectively raised and lowered by the vertically displaceable actuator mechanism between a raised position above the finish of the bottle and a lowered position on the finish of the bottle.

17. A machine as defined in claim 16, wherein the system control operates to cause the vertically displaceable actuator mechanism to lower the sealing plate onto the finish of the bottle prior to displacing the head to the pre-fill height position, to raise the sealing plate off of the finish of the bottle after the level sensor senses liquid at the pre-fill height, and to lower the sealing plate onto the finish of the bottle prior to displacing the head to the post-fill height position.

18. A machine as defined in claim 17, additionally comprising:

a sensor that detects when the sealing plate is located on the finish of the bottle, after which the head may be displaced to the pre-fill height position or the post-fill height position.

19. A machine as defined in claim 12, wherein the first liquid supply apparatus comprises:

a high pressure pump; and a valve for controlling the delivery of liquid from the first liquid supply apparatus; and wherein the second liquid supply apparatus comprises:

a low pressure pump; and a valve for controlling the delivery of liquid from the second liquid supply apparatus.

20. A machine as defined in claim 12, wherein the flow measurement apparatus comprises:

a Coriolis mass flow meter.

* * * * *